(12) United States Patent
Pearson et al.

(10) Patent No.: US 9,759,591 B2
(45) Date of Patent: Sep. 12, 2017

(54) UNDERSHOT GATE FLOW CONTROL SYSTEM WITH FLOW DIVERTER

(71) Applicant: Rubicon Research Pty Ltd, Hawthorn, Victoria (AU)

(72) Inventors: Damien Vernon Pearson, Kew East (AU); Reece Joseph Tyrrell, Hawthorn (AU)

(73) Assignee: RUBICON RESEARCH PTY LTD, Hawthorn East, Victoria (AU)

( * ) Notice: Subject to any disclaimer, the term of this patent is extended or adjusted under 35 U.S.C. 154(b) by 82 days.

(21) Appl. No.: 14/435,144

(22) PCT Filed: Oct. 11, 2013

(86) PCT No.: PCT/US2013/001185
§ 371 (c)(1),
(2) Date: Apr. 10, 2015

(87) PCT Pub. No.: WO2014/056046
PCT Pub. Date: Apr. 17, 2014

(65) Prior Publication Data
US 2016/0282159 A1    Sep. 29, 2016

(30) Foreign Application Priority Data

Oct. 11, 2012    (AU) ................. 2012904449

(51) Int. Cl.
| | | |
|---|---|---|
| *E02B 7/20* | (2006.01) | |
| *G01F 1/66* | (2006.01) | |
| *G01F 1/00* | (2006.01) | |
| *E02B 7/26* | (2006.01) | |
| *E02B 13/02* | (2006.01) | |
| *G01B 13/06* | (2006.01) | |
| *G01P 5/24* | (2006.01) | |

(Continued)

(52) U.S. Cl.
CPC ............... *G01F 1/667* (2013.01); *E02B 7/26* (2013.01); *E02B 13/02* (2013.01); *G01B 13/065* (2013.01); *G01F 1/002* (2013.01); *G01F 1/66* (2013.01); *G01P 5/245* (2013.01); *E02B 7/28* (2013.01); *E02B 8/04* (2013.01)

(58) Field of Classification Search
None
See application file for complete search history.

(56) References Cited

U.S. PATENT DOCUMENTS

| | | |
|---|---|---|
| 3,942,328 A | 3/1976 | Bunger |
| 5,780,747 A * | 7/1998 | Soo ............ G01F 1/002 73/861.29 |

(Continued)

OTHER PUBLICATIONS

International Application No. PCT/AU2013/001185, Written Opinion and International Search Report mailed Dec. 17, 2013.

*Primary Examiner* — Harshad R Patel
(74) *Attorney, Agent, or Firm* — David D. Brush; Westman, Champlin & Koehler, P.A.

(57) ABSTRACT

An undershot gate system controls flow of liquid through an open channel or pipe. The system includes a gate leaf adapted to be raised and lowered by a control to allow flow of liquid along the open channel or pipe. The gate leaf has a flow diverter at an end of the gate leaf to guide liquid under the gate leaf and through an opening when the gate leaf is in an open position.

22 Claims, 17 Drawing Sheets

(51) Int. Cl.
 *E02B 8/04* (2006.01)
 *E02B 7/28* (2006.01)

(56) References Cited

U.S. PATENT DOCUMENTS

| | | | |
|---|---|---|---|
| 6,427,718 B1* | 8/2002 | Stringam | A01G 25/16 137/392 |
| 6,550,345 B1* | 4/2003 | Letton | G01F 1/662 73/861.27 |
| 2002/0066484 A1* | 6/2002 | Stringam | A01G 25/16 137/392 |
| 2006/0005611 A1* | 1/2006 | Betz | G01F 1/002 73/61.75 |
| 2010/0097892 A1 | 4/2010 | Aughton et al. | |
| 2012/0144930 A1 | 6/2012 | Aughton et al. | |

* cited by examiner

UNDERSHOT GATE FLOW CONTROL SYSTEM WITH FLOW DIVERTER

CROSS-REFERENCE TO RELATED APPLICATIONS

This application is a national stage application pursuant to 35 U.S.C. §371 of International Application No. PCT/AU2013/001185, filed Oct. 11, 2013, which claims priority to Australian Patent Application No. 2012904449, filed Oct. 11, 2012, the disclosures of which are hereby incorporated by reference herein.

BACKGROUND OF THE INVENTION

The present invention relates to flow measurement through a submerged orifice and relates particularly, but not exclusively, to flow measurement through an undershot irrigation gate.

SUMMARY OF THE INVENTION

According to one aspect, the present invention provides an undershot gate system to control flow of liquid through an open channel or pipe, said system including a gate leaf adapted to be raised and lowered by a control means to allow flow of liquid along said open channel or pipe, said gate including a flow diverter at an end of said gate leaf to guide liquid under said gate leaf and through an opening when said gate leaf is in an open position.

In one embodiment, said flow diverter includes a substantially horizontally disposed projection from one side of said end of said gate leaf, either upstream or downstream of said gate leaf. Preferably an arcuate section is provided along the free end of said substantially horizontally disposed projection.

In a further embodiment, said flow diverter includes an arcuate section along one side of said end of said gate leaf. Preferably said flow diverter further includes a substantially horizontally disposed projection from the other side of said end of said gate leaf.

Preferably said undershot gate system further includes a pair of acoustic transducers on the bottom of said open channel or pipe, adapted to provide an acoustic path to and from underneath said substantially horizontally disposed projection to allow measurement of the opening of said gate leaf.

Preferably said undershot gate system further includes a plurality of pairs of acoustic transducers forming an acoustic array on opposing sides of said open channel or pipe to provide, in use, a plurality of multiple planes of crossed acoustic paths for measurement of flow velocity through said gate opening.

In one embodiment, said plurality of pairs of acoustic transducers on opposing sides of said open channel or pipe are downstream and adjacent said gate leaf.

In a further embodiment, said plurality of pairs of acoustic transducers on opposing sides of said open channel or pipe are upstream and adjacent said gate leaf.

In yet a further embodiment, one set of respective acoustic transducers of said plurality of pairs of acoustic transducers on opposing sides of said open channel or pipe are downstream and adjacent said gate leaf, and the other set of respective acoustic transducers of said plurality of pairs of acoustic transducers on opposing sides of said open channel or pipe are upstream and adjacent said gate leaf, with said plurality of multiple planes of crossed acoustic paths crossing through said gate opening.

Preferably said plurality of pairs of acoustic transducers have a small beam angle to the direction of flow, to allow each acoustic array to have a shorter width.

According to a further aspect, the present invention provides an undershot gate system to control flow of liquid through an open channel or pipe, said system including a gate leaf adapted to be raised and lowered by a control means to allow flow of liquid along said open channel or pipe, a plurality of pairs of acoustic transducers forming an acoustic array on opposing sides of said open channel or pipe to provide, in use, a plurality of multiple planes of crossed acoustic paths for measurement of flow velocity through said gate opening, and a means to measure the height of the opening of said gate leaf.

Preferably said undershot gate system further includes a pair of acoustic transducers on the bottom of said open channel or pipe, adapted to provide an acoustic path to and from underneath said gate leaf to allow measurement of the opening of said gate leaf.

In one embodiment, said plurality of pairs of acoustic transducers on opposing sides of said open channel or pipe are downstream and adjacent said gate leaf.

In a further embodiment, one set of respective acoustic transducers of said plurality of pairs of acoustic transducers on opposing sides of said open channel or pipe are downstream and adjacent said gate leaf, and the other set of respective acoustic transducers of said plurality of pairs of acoustic transducers on opposing sides of said open channel or pipe are upstream and adjacent said gate leaf, with said plurality of multiple planes of crossed acoustic paths crossing through said gate opening.

Preferably said plurality of pairs of acoustic transducers have a small beam angle to the direction of flow, to allow each acoustic array to have a shorter width.

Preferably said undershot gate system further includes a flow diverter at an end of said gate leaf to guide liquid under said gate leaf, and through the gate opening, when said gate leaf is in an open position.

In one embodiment, said flow diverter includes an arcuate section along one side of said end of said gate leaf. Preferably said flow diverter further includes a substantially horizontally disposed projection from the other side of said end of said gate leaf.

In a further embodiment, said flow diverter includes a substantially horizontally disposed projection from one side of said end of said gate leaf, either upstream or downstream of said gate leaf. Preferably an arcuate section is provided along the free end of said substantially horizontally disposed projection.

According to yet a further aspect, the present invention provides a method of measuring flow rate of a liquid passing through an open gate of an undershot gate system installed in an open channel or pipe, said method including the steps of: providing a plurality of pairs of acoustic transducers forming an acoustic array on opposing sides of said open channel or pipe, said acoustic arrays producing a plurality of multiple planes of crossed acoustic paths; providing means to measure the height of said open gate relative to a base of said open channel or pipe; determining a vertical velocity profile of said liquid passing through said open gate utilising said acoustic arrays; determining the height of said open gate utilising said means to measure the height of said open gate relative to said base of said open channel or pipe; calculating a velocity integral of said vertical velocity profile utilising said determined height of said open gate; and, calculating said flow rate of said liquid passing through said open gate by multiplying said velocity integral by a predetermined internal width of said acoustic arrays.

These and other essential or preferred features of the present invention will be apparent from the description that now follows.

BRIEF DESCRIPTION OF THE DRAWINGS

The structure and functional features of preferred embodiments of the present invention will become more apparent from the following detailed description, when taken in conjunction with the accompanying drawings, in which:—

DESCRIPTION OF THE PREFERRED EMBODIMENTS

Figure 1:
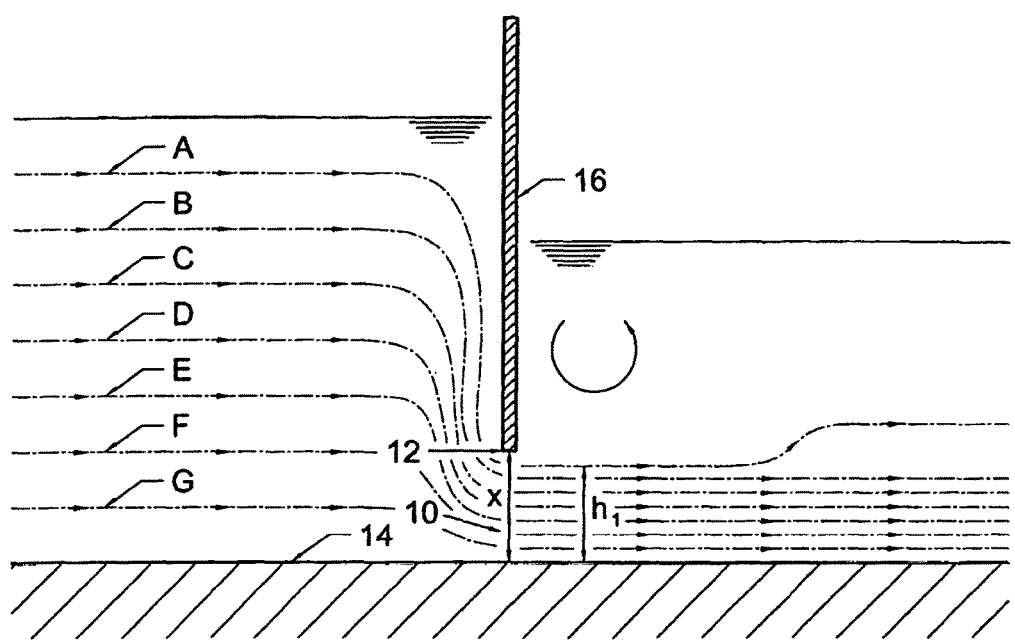
FIG. 1 is a cross-sectional view of an undershot gate in an irrigation system, with the gate open and showing the flow of water through the gate.

In order to avoid duplication of description, identical reference numerals will be shown, where applicable, throughout the illustrated embodiments to indicate similar integers.

The flow passing through a submerged rectangular orifice is commonly computed by the following energy equation:

$$Q = C_c w \cdot h \sqrt{2g(u-d)}$$

Where:
Q=flow rate in m³/s
w=width of rectangular orifice opening in m
h=height of rectangular orifice opening in m
g=acceleration due to gravity in (m/s²)
u=water level upstream of orifice in m
d=water level downstream of orifice in m Cc=contraction coefficient=depth of water jet behind orifice/orifice opening height This equation is derived from Bernoulli's equation, which simply states that the sum of kinetic and potential energy is always a constant at constant pressure.

$$p + \tfrac{1}{2}\rho V^2 + \rho g h = \text{constant}$$

Where:
p is the pressure
ρ is the density
V is the velocity
h is the elevation
g is the gravitational acceleration The velocity is computed from Bernoulli's equation as the value:

$$V = \sqrt{2g(u-d)}$$

The flow rate is determined by multiplying this velocity by the apparent area of the jetting velocity field passing through the orifice.

This invention will allow the measurement of flow rate by measuring the jetting velocity field passing through a rectangular submerged orifice, and then multiplying this velocity field by the measured area of the rectangular submerged orifice.

In FIG. 1 there is shown a submerged rectangular orifice or opening 10 between the end face 12—of a vertically movable gate 16 and the floor 14 of an irrigation open channel. The jetting velocities of the flow through gate 16 need to be measured to provide an accurate flow rate of water flowing through gate 16. The streamlines A to G show a typical profile upstream, through and downstream of gate 16. It can be seen that the streamlines A to G passing through the orifice 10 are parallel to the floor 14 of orifice 10. If there is a sufficient straight approach length upstream of the orifice 10 then the streamlines A to G are also parallel to the walls (not shown) enclosing each side of the orifice 10.

It can be seen in FIG. 1 that there is generally known to be a contraction of the streamlines A to G downstream of the orifice 10 such that the depth of the velocity field hi is less than the opening height of the orifice x; The ratio $h_1/x$ is commonly referred to as a contraction coefficient (Cc). FIG. 1 shows that adjacent to the jetting streamlines A to G passing beneath the orifice 10 there is a stagnant region of water with a zero net velocity. The entire flow velocity passes through a depth $h_1$. Hence the flow rate passing through the orifice can be determined by integrating the vertical velocity profile passing through orifice 10 through a vertical range bounded by the floor 14 of the orifice 10 and by the height h1 of the velocity field and then multiplying this velocity integral by the known width of the orifice 10. The height of the velocity field $h_1$ may be determined through knowledge of the vertical velocity distribution as measured by an acoustic array.

Figure 2:
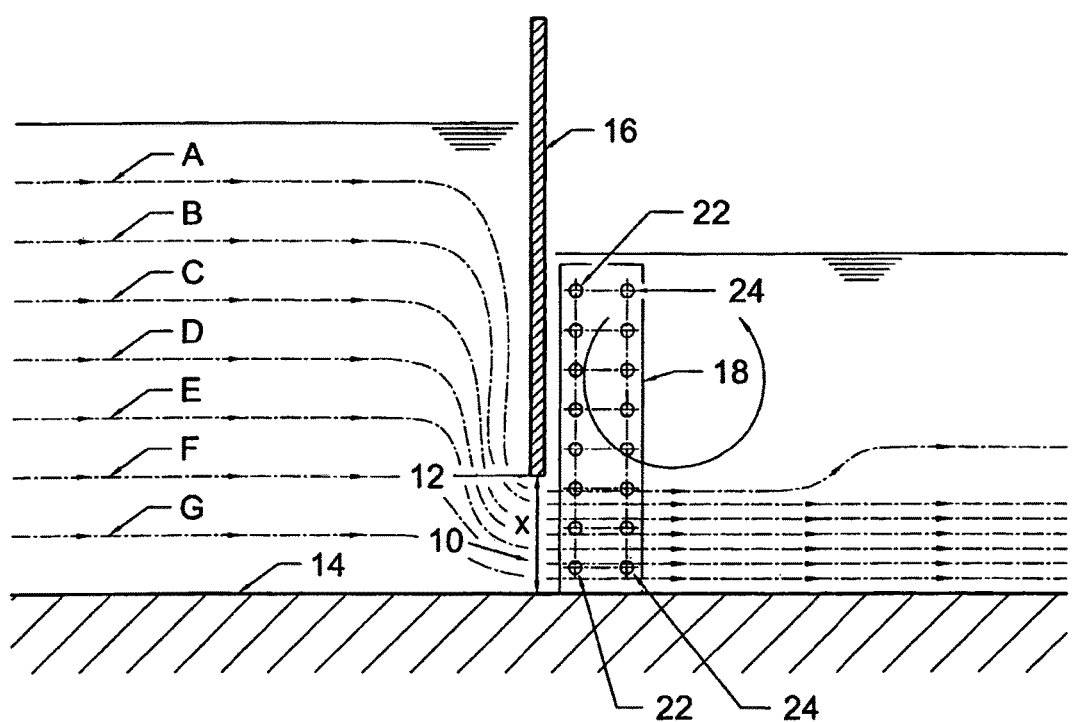
FIG. 2 is a similar view to that of FIG. 1, with an array of acoustic transducers on the downstream side of an undershot gate installed in an open channel according to a first aspect of the invention.
Figure 8:
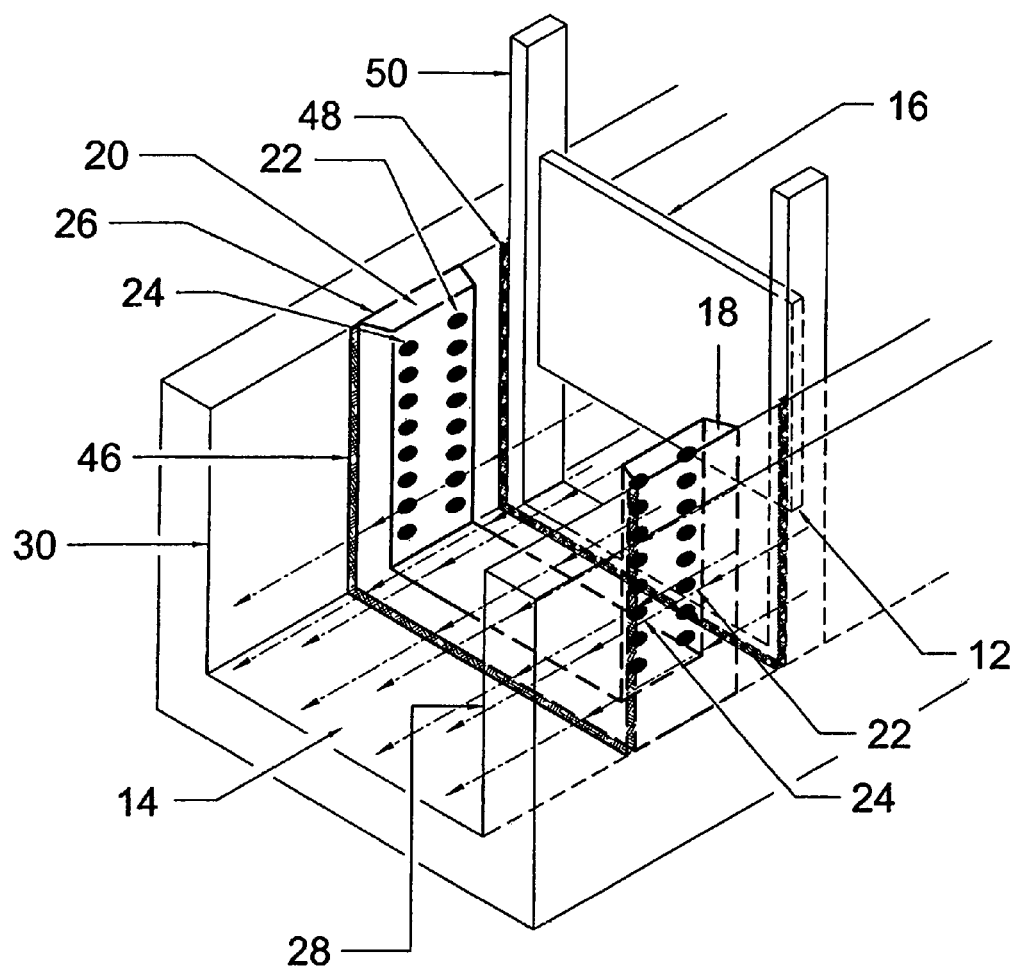
FIG. 8 is a perspective view of FIG. 2.

FIGS. 2 and 8 show the inclusion of a pair of opposing acoustic arrays 18, 20 downstream of gate 16. Each pair of acoustic arrays includes a pair of acoustic transducers 22, 24 which operate in a crossed path arrangement i.e. acoustic transducer 22 of array 18 interacts with the opposing acoustic transducer 24 of array 20 to provide multiple planes of crossed path acoustic transit time velocity measurements. Each acoustic array 18, 20 consist of eight (or any number as is reasonably practicable) horizontal velocity measurement planes. The velocity field passing through the rectangular submerged orifice 10 is measured based on the transit time velocity measurement principle as previously described in International Patent Application No. PCT/AU2010/001052 (the contents of which are herein incorporated) and in the ISO Standard 16:2004(E) Hydrometry—Measurement of discharge by the ultrasonic (acoustic) method. Acoustic arrays 18, 20 have a small beam path angle relative to the direction of flow of 11.25°, however any angle may be used as is practicable. The choice of a small beam angle allows the acoustic arrays 18, 20 to have a short overall assembly width such that the measured field of view lies immediately in the vicinity of the submerged rectangular orifice 10. The acoustic arrays 18, 20 are arranged adjacent gate 16 to ensure that there is a sufficient straight approach length upstream of orifice, such that each of the streamlines A to G pass through the length of the acoustic arrays 18, 20 at a constant angle relative to the parallel walls 28, 30, enclosing each side of the orifice 10, and do not experience a change in direction as they pass through the length of the acoustic arrays 18, 20.

The multitude of measurement planes are combined in a vertical array to provide a high-resolution sample of the vertical velocity profile of the flow passing though the acoustic arrays 18, 20. FIG. 2 illustrates that three velocity samples are available for computing the integral of the velocity field encompassed by the jetting flow streamlines. An abrupt transition is known to occur at the boundary of the jetting streamlines to a stationary water region behind the gate 16 with zero net velocity. The velocity field passing through the acoustic arrays 18, 20 is vertically integrated from the floor 14 of the array to the ceiling of the array. It is known that the velocity field transitions abruptly from a high velocity to a zero velocity at the measured top boundary of the jetting velocity field. The location of the boundary of the velocity field can be determined by several means including by measurement of the gate opening height, and by analysis of the velocity profile observed by the acoustic planes located within the jetting velocity field. As the opening of the gate 16 changes, so does the boundary between the jetting flow and the stationary water along with the number of acoustic measurement planes incorporated into the velocity integration. Flow is computed by integrating this vertical velocity profile from the floor 14 of the acoustic arrays 18, 20 to the ceiling of the acoustic arrays 18, 20, and multiplying this integral by the known internal width of the rectangular acoustic arrays 18, 20. If the gate 16 is opened above the water surface, such that there is a free water surface below the end face 12 of gate 16, then the gate opening height is not used in the measurement of flow. In this instance the vertical velocity profile is integrated from the floor 14 of the acoustic arrays 18, 20, to the water level as measured by a water level sensor (not shown). This velocity integral is then multiplied by the known internal width of the rectangular acoustic arrays 18, 20 to compute the flow rate passing through the acoustic arrays 18, 20. The orifice opening x may be measured by any suitable means including linear encoder, drawstring, or by an acoustic transducer (not shown) which measures the distance between the floor 14 of the orifice 10 and the end face 12 of gate 16.

Seals or a sealing compound 46 will prevent leakage between sidewalls 28, 30 and acoustic arrays 18, 20. Similarly, seals or a sealing compound 48 will prevent leakage between sidewalls 28, 30, and gate frame 50 in which gate 16 is slidably received.

Figure 3:
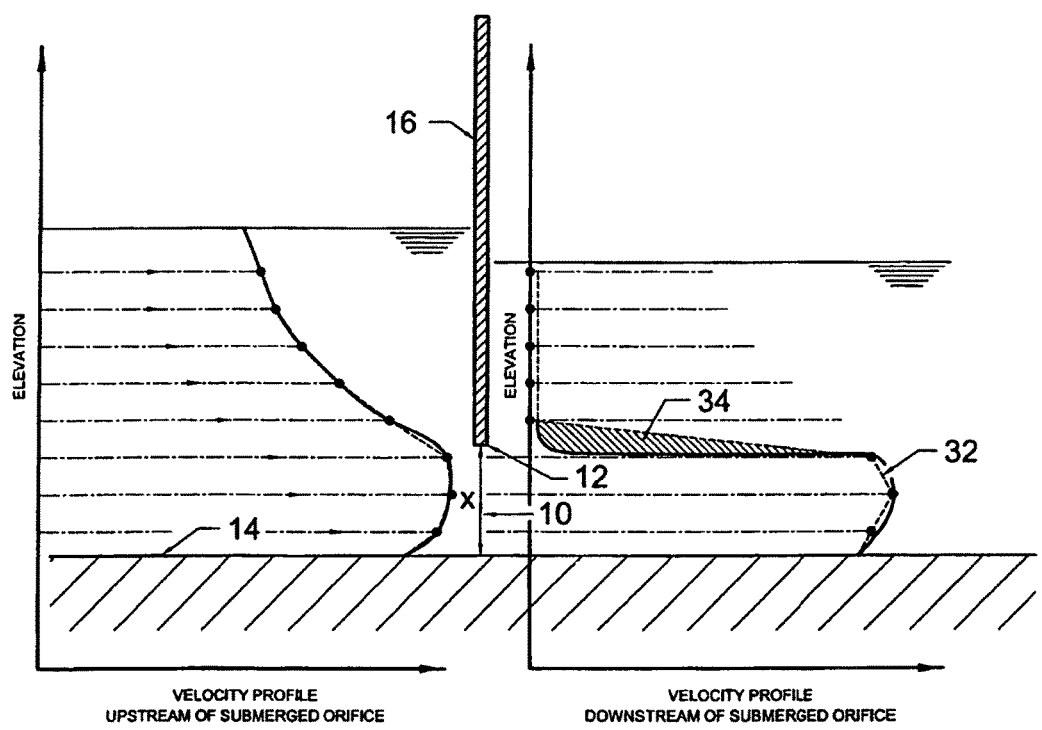
FIG. 3 is an enlarged view of FIG. 1, showing the velocity profiles around the gate Shown in FIG. 1.

FIG. 3 illustrates the difference between the operations of the system disclosed in International Patent Application No. PCT/AU2010/001052, and the present embodiment. The distinction is that the invention defined in PCT/AU2010/001052 measures accurately upstream of a submerged orifice 10 where the vertical velocity distribution is a smooth function without any discontinuities. The present embodiment measures accurately downstream of the submerged orifice 10 where there is a 'step function' discontinuity in the vertical velocity distribution at the location of the gate end face 12. The present embodiment uses the measured elevation of the gate 16 to locate the elevation of this velocity discontinuity, and hence, to determine the elevation at which the flow velocity transitions rapidly to zero. This allows accurate velocity integration by integrating the velocity step function vertically from the floor 14 to the elevation of the velocity discontinuity as determined from the elevation of the gate end face 12. Without knowledge of the velocity discontinuity elevation, a trapezoidal integration would result in a significant over-read or under-read of the velocity integral by attempting to interpolate using a straight line connecting each velocity sample. FIG. 3 shows the velocity profile upstream of the submerged orifice 10 on the left hand side velocity-elevation trend, and the velocity profile downstream of the submerged orifice 10 on the right hand side velocity-elevation trend.

FIG. 3 illustrates that trapezoidal integration would result in a large over-estimate of flow passing beneath the gate. The over-read would be proportional to the triangular area 34 above the velocity discontinuity as shown in the right-hand side diagram.

Figure 4:
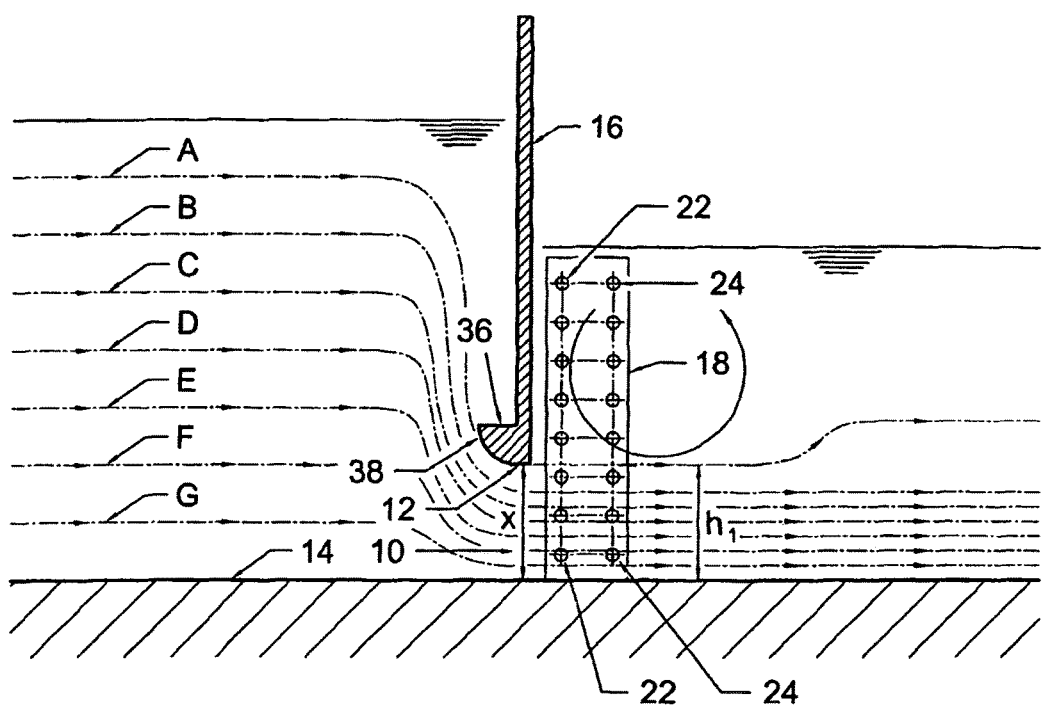
FIG. 4 is a similar view to that of FIG. 2, where the gate edge has a preferred arcuate section along the frontal face of the gate.

FIG. 4 is a similar embodiment to that of FIG. 2, with an arcuate section 36 along the end of gate 16 upstream of gate 16. It has been determined through computational fluid dynamics analysis, and through velocity field observations in a flow laboratory, that the inclusion of curved surface 38 on gate 16 reduces the contraction of the velocity field downstream of the orifice 10, such that the height $h_1$ is closely approximated by the measurable orifice opening height x, i.e. $h_1$ is approximately equal to x. A comparison with FIG. 2 illustrates this difference.

Figure 5:
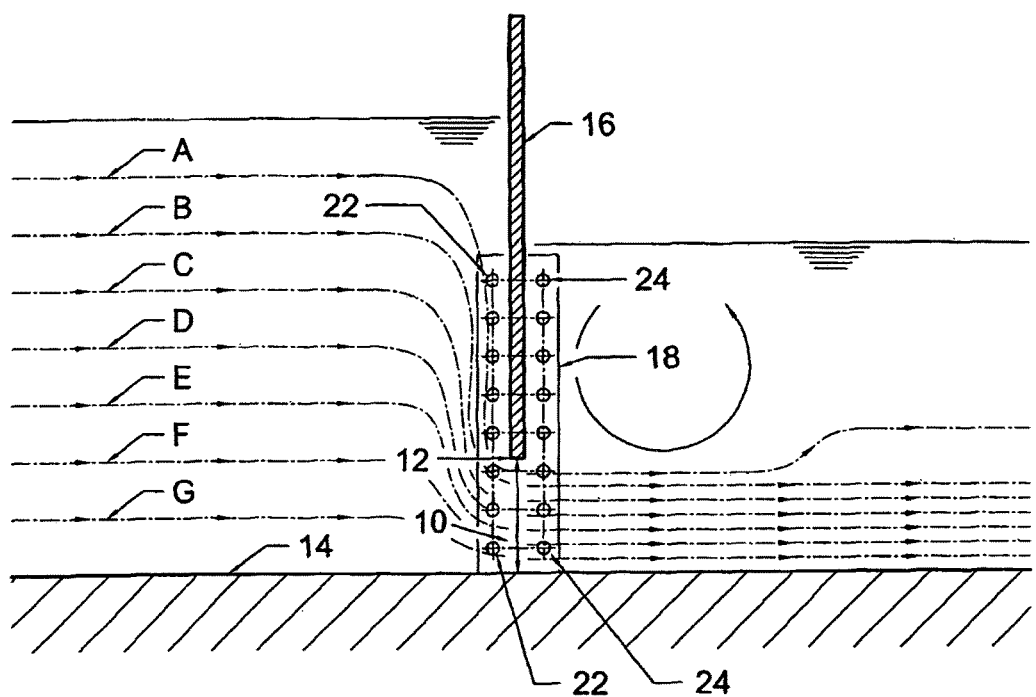
FIG. 5 is a similar view to that of FIG. 2, where the acoustic transducers are on either side of the gate.

FIG. 5 is a further alternative embodiment to FIG. 2, where gate 16 is located between the columns of acoustic transducers 22, 24 of acoustic arrays 18, 20. Such an arrangement allows the acoustic transducers 22, 24 to be very close to gate 16.

Figure 6:
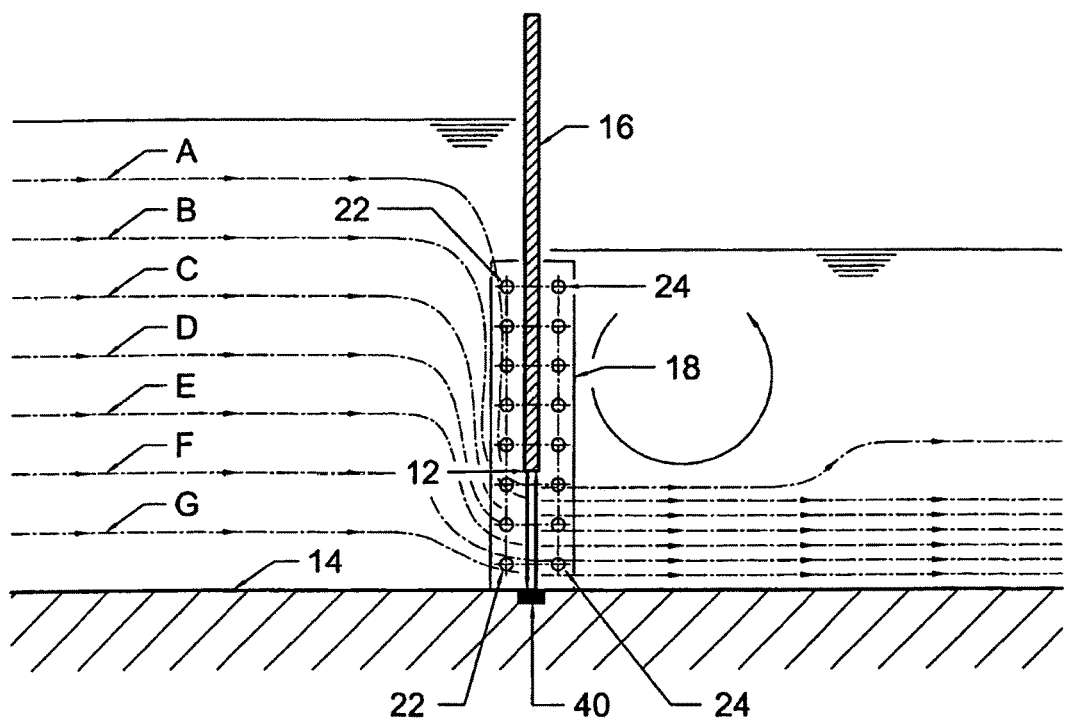
FIG. 6 is a similar view to that of FIG. 5, including a preferred device to measure the gate opening.

FIG. 6 is a variation of the embodiment of FIG. 5, including an acoustic transducer 40 located on floor 14 that is used to determine the height from floor 14 to the end face or underside 12 of gate 16. A standard acoustic distance measurement is undertaken in which an acoustic pulse is transmitted from the transducer 40, reflects off the underside 12 of gate 16, and returns to the transducer 40 or to a secondary receiving transducer (not shown). The flight time of an acoustic pulse is measured by timing electronics (not shown). Given knowledge of the speed of sound in water, the distance between the floor and underside 12 of gate 16 is computed. Two transducers are preferably used with one transducer acting as a transmitter and the other acting as a receiver. This configuration overcomes the blanking distance commonly associated with single transducer configurations, limiting the minimum distance that can be measured. Any embodiment of this specification can utilise transducer 40, and therefore its use is not limited to FIG. 6.

Figure 7:
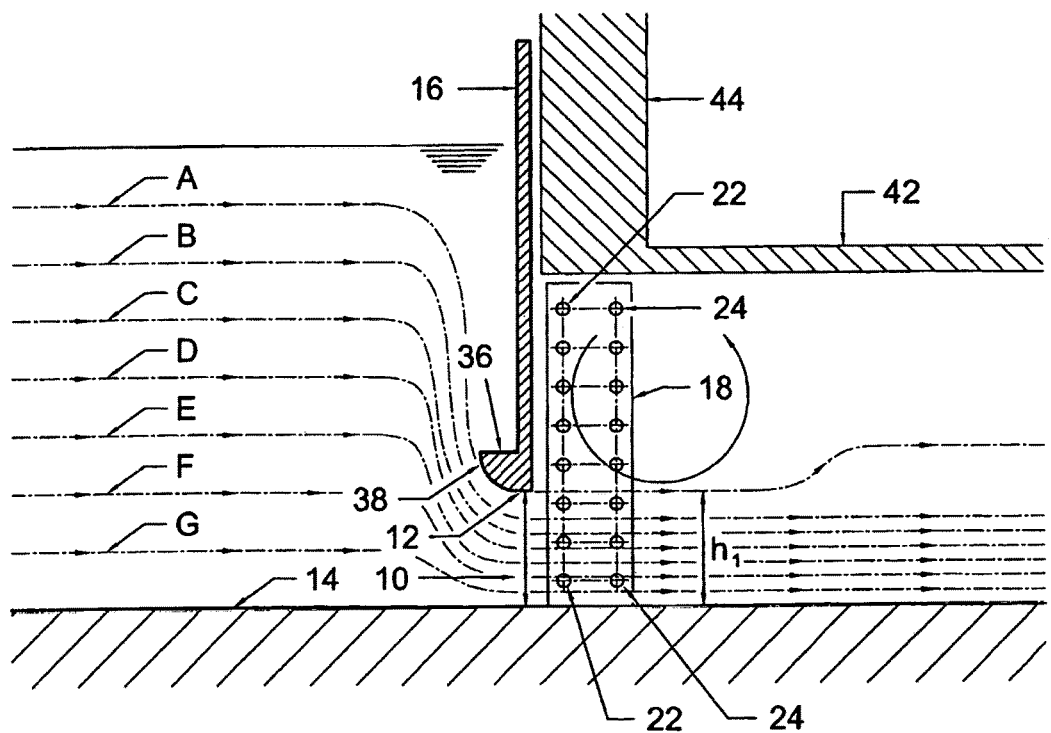
FIG. 7 is a similar view to that of FIG. 4, where the gate is in front of a head wall of a pipe.

FIG. 7 is a variation of the embodiment of FIG. 4, where gate 16 in the open channel closes a pipe 42 with a headwall 44. FIG. 7 has acoustic arrays 18, 20 located downstream of gate 16, and inserted into pipe 42 downstream of headwall 44.

Figure 9:
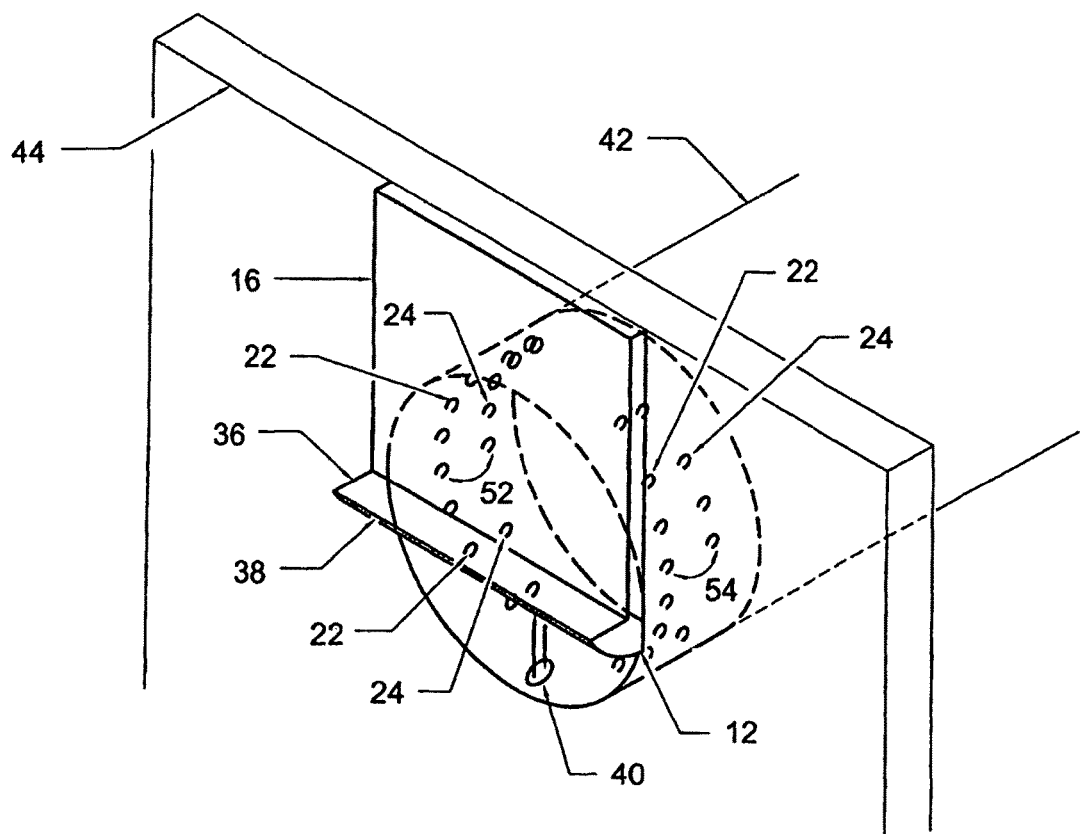
FIG. 9 is a perspective view of FIG. 7.

FIG. 9 is a perspective view of a variation of the embodiment of FIG. 7, with the addition of transducer 40 from FIG. 6. This embodiment uses circular acoustic arrays 52, 54, instead of rectangular acoustic arrays 18, 20 of the prior embodiments.

Figure 10:
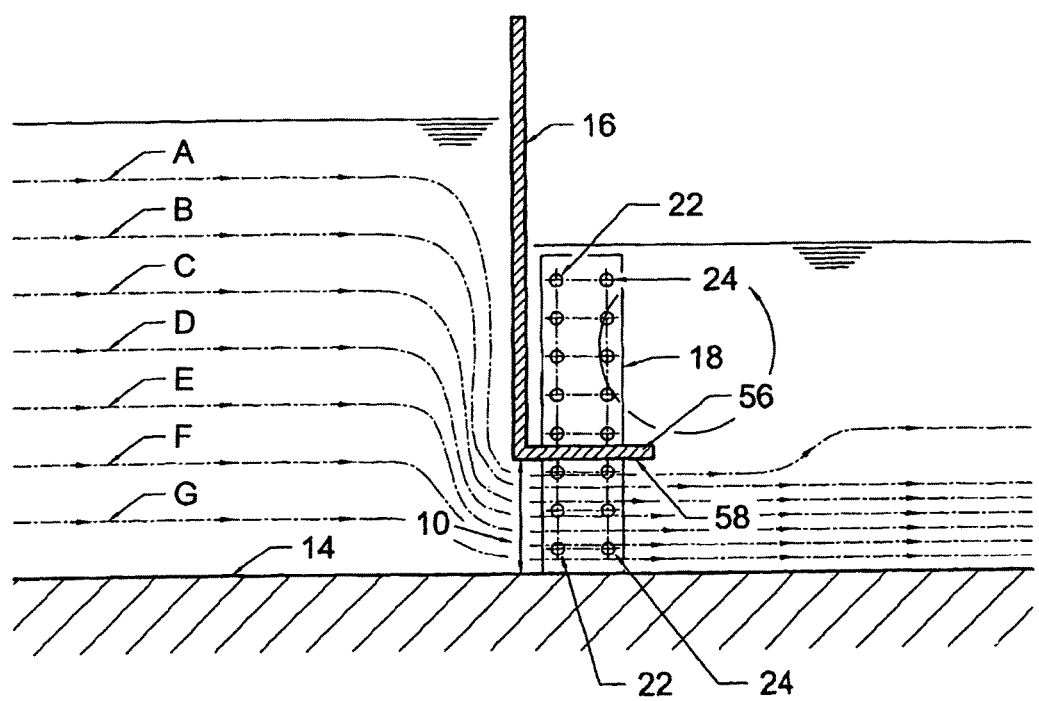
FIG. 10 is a cross-sectional view of an undershot gate having a preferred flow diverter and an array of acoustic transducers on the downstream side of the undershot gate installed in an open channel according to a second aspect of the invention.

FIG. 10 shows the same configuration as the embodiment of FIG. 2, but with the inclusion of a flow diverter 56 rigidly connected to the downstream end of gate 16 that forms a ceiling 58 of closed rectangular acoustic arrays 18, 20, completely containing the jetting velocity profile. The flow passing through orifice 10 is computed by integrating the sampled velocity field from the floor 14 to the ceiling 58 of the acoustic arrays 18, 20. The height of the ceiling 58 of the acoustic arrays 18, 20 is determined by any commonly employed linear measurement technique, with a preferred solution being an acoustic sensor, which is used to measure the height of the ceiling 58 above the floor 14 of the acoustic arrays 18, 20. The flow diverter 56 will assist in parallel alignment of flow streamlines relative to the floor 14 and flow diverter ceiling 58. This will assist in more accurate measurement of flow velocities.

Figure 11:
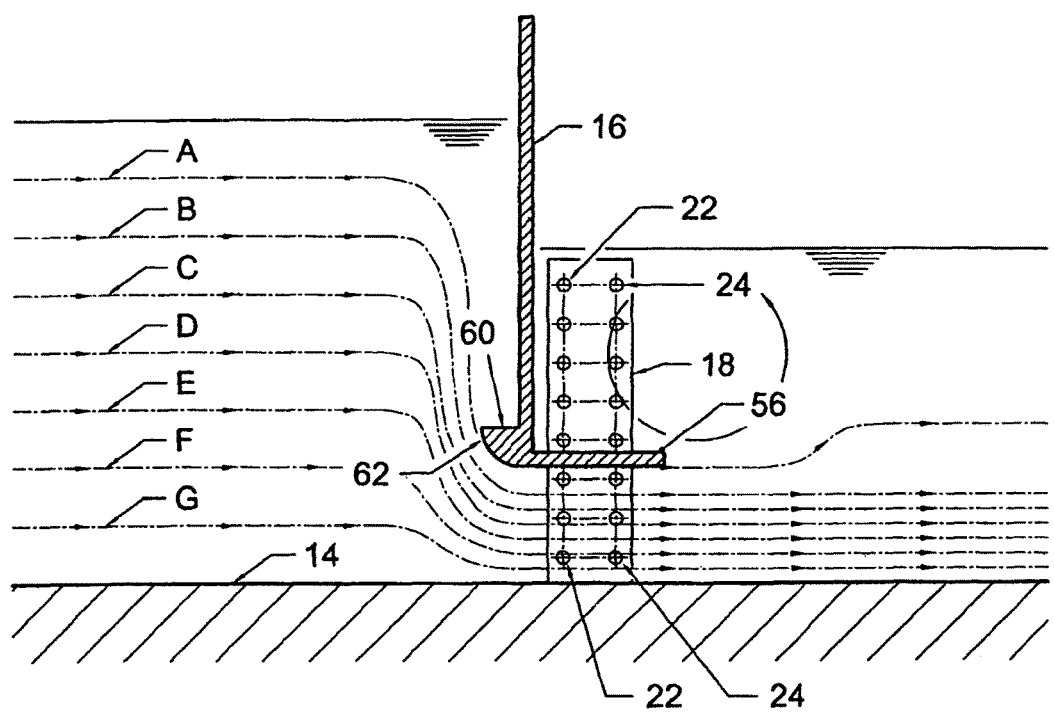
FIG. 11 is a similar view to that of FIG. 10, where the gate edge has a preferred arcuate section along the frontal face of the gate.

FIG. 11 is a variation of the embodiment of FIG. 10, with an arcuate section 60 along the end of gate 16, upstream of gate 16. It has been determined through computational fluid dynamics analysis, and through velocity field observations in a flow laboratory, that the inclusion of curved surface 62 reduces the contraction of the velocity field downstream of the orifice 10, in a similar manner to the embodiment of FIG. 4.

Figure 12:
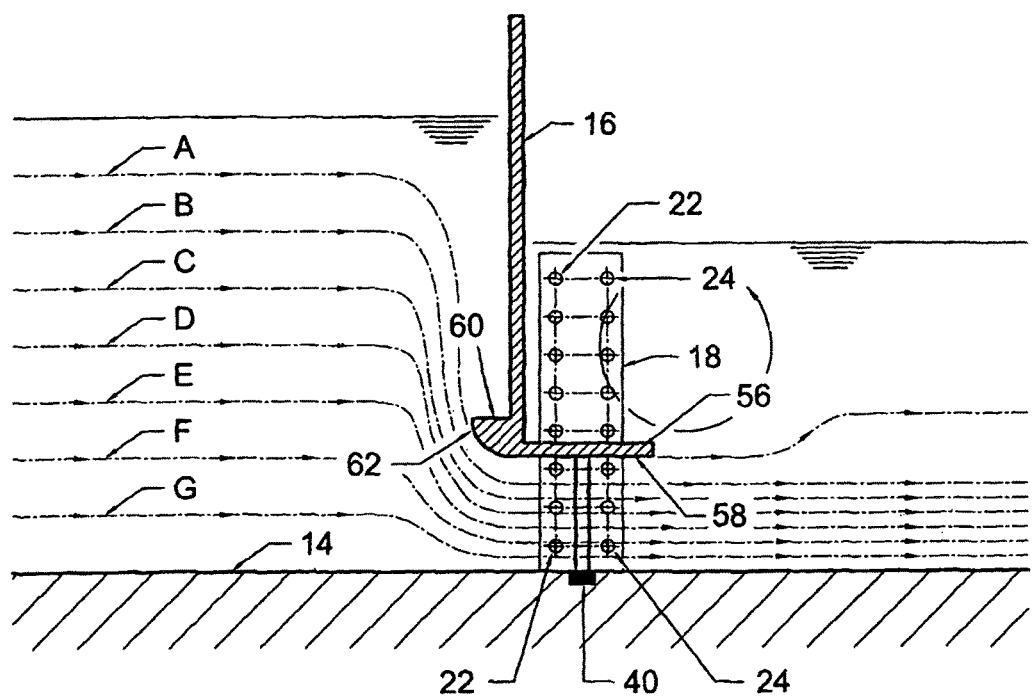
FIG. 12 is a similar view to that of FIG. 11, including a preferred device to measure the gate opening.

FIG. 12 is a variation of the embodiment of FIG. 11, including an acoustic transducers) 40 located on floor 14 that is used to determine the height from floor 14 to the ceiling 58 of flow diverter 56, as described with reference to FIG. 6. The configuration of the upward ranging transducer(s) 40 defined in this embodiment of the invention avoids any impact from silt on floor 14. When gate 16 is closed, the ceiling 58 covers the upwardly ranging transducer(s) 40 such that no silt can settle upon them. Instead, the silt will settle on top of flow diverter 56. When the gate 16 is opened, jetting velocities passing through the meter will flush any debris or sediment off the face of the upward shooting acoustic transducers 40. Hence these upward ranging acoustic transducers 40 are in a self-cleaning configuration and are not subject to attenuation and malfunction caused by deposited silt and sediment as is known to occur with other technologies which employ upward ranging water level sensors in an irrigation canal and natural waterway environment.

Figure 13:
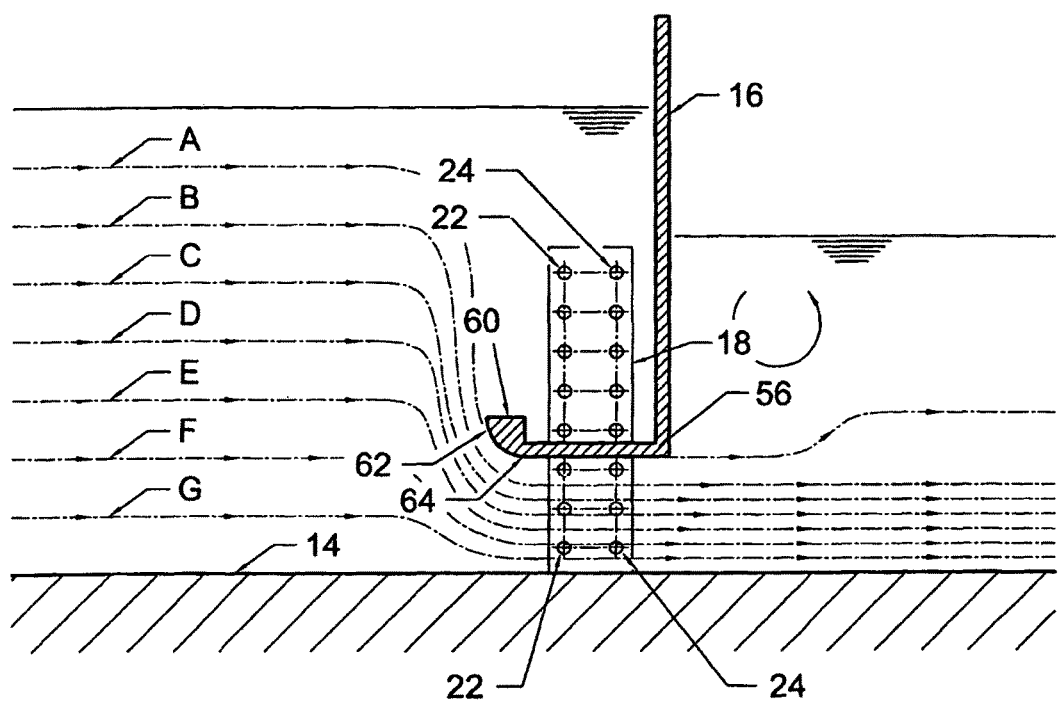
FIG. 13 is a similar view to that of FIG. 10, having an array of acoustic transducers on the upstream side of an undershot gate installed in an open channel, with a preferred arcuate section along the frontal face of the flow diverter.

FIG. 13 is a variation of the embodiment shown in FIG. 11, where the arcuate section 60 is affixed at the free end 64 of flow diverter 56 facing the upstream end of gate 16, rather than the downstream end shown in FIG. 11. In addition, acoustic arrays 18, 20 are also positioned at the upstream end of gate 16 to create an adjustable geometry rectangular conduit which encompasses the acoustic arrays 18, 20, and which causes the streamlines passing through the acoustic arrays 18, 20 to be parallel with the four walls of the rectangular conduit. This embodiment is well suited to installations where the acoustic arrays 18, 20 cannot be located on the downstream side of gate 16.

Figure 14:
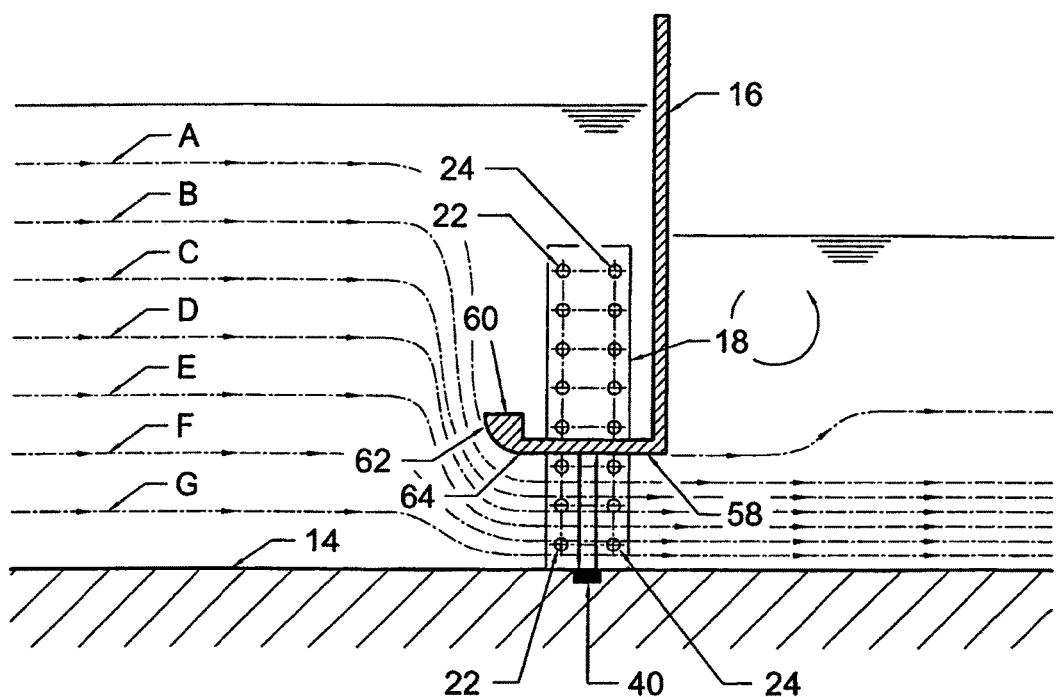
FIG. 14 is a similar view to that of FIG. 13, including a preferred device to measure the gate opening.

FIG. 14 is a similar embodiment to that of FIG. 13, which includes acoustic transducer(s) 40 to determine the height of ceiling 58, of flow diverter 56, as previously discussed with reference to FIG. 6.

Figure 15:
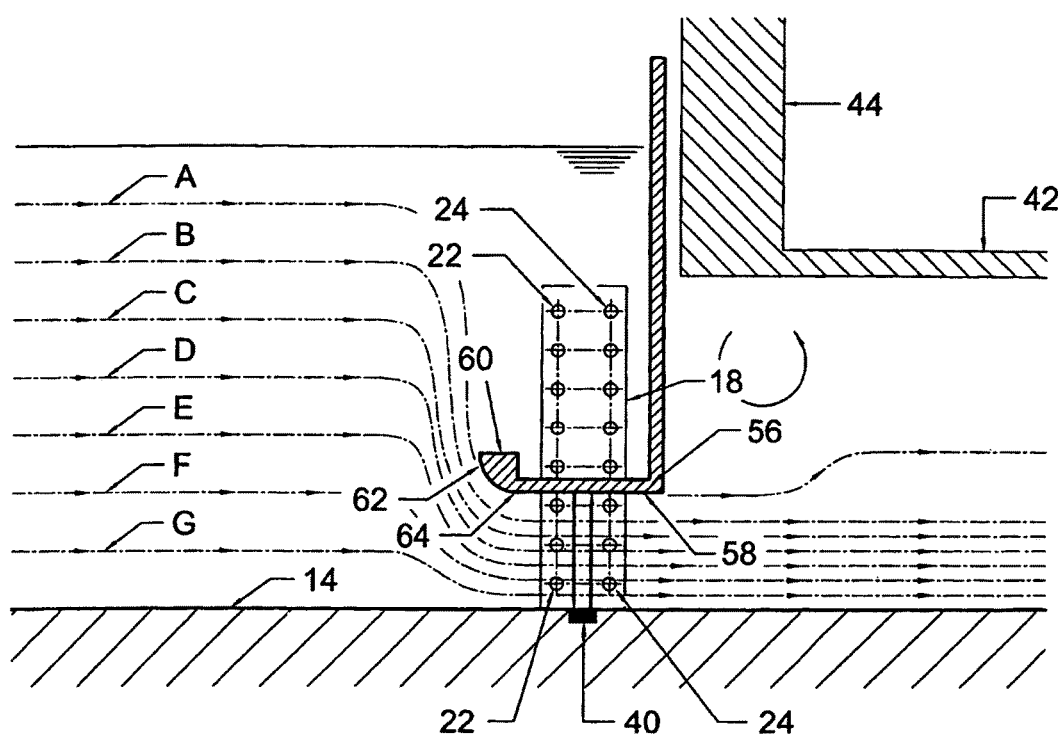
FIG. 15 is a similar view to that of FIG. 14, where the gate is in front of a headwall of a pipe.

FIG. 15 is a similar embodiment to that of FIG. 14, where the acoustic arrays 18, 20 are located upstream of the gate 16, on a pipe entry headwall 44 of pipe 42.

Figure 16:
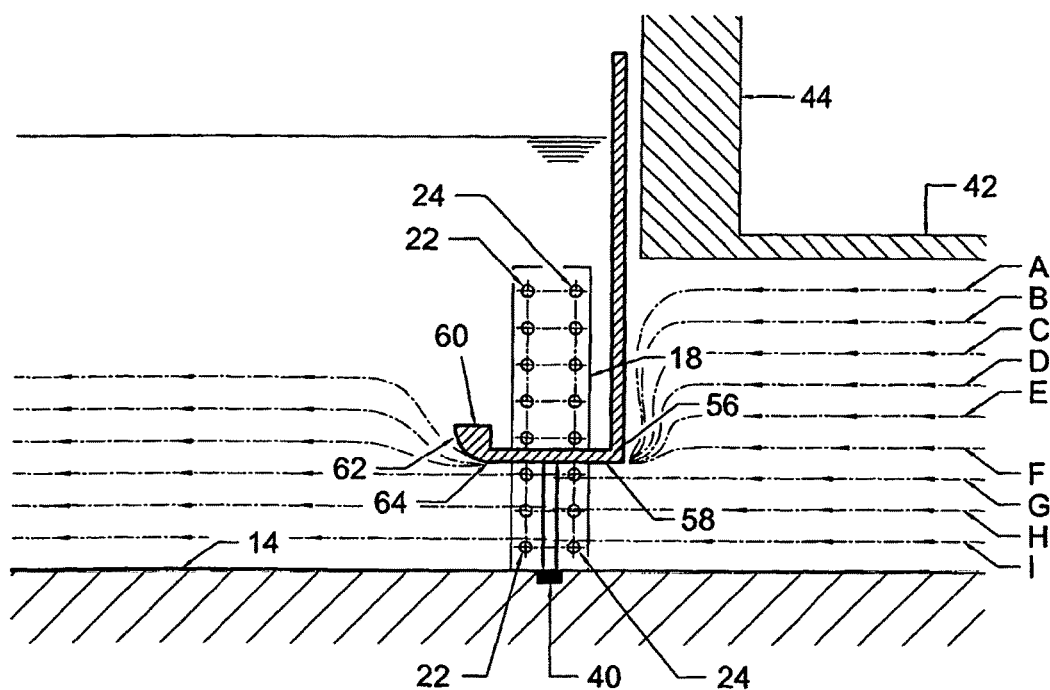
FIG. 16 is similar view to that of FIG. 15, with the gate and array of acoustic transducers mounted downstream of a pipe exit headwall.

FIG. 16 is a similar embodiment to that of FIG. 15, only the direction of flow of water through the pipe 42 is reversed. Hence, this time the acoustic arrays 18, 20 are located downstream of gate 16, on the downstream exit headwall 44 of pipe 42.

Figure 17:
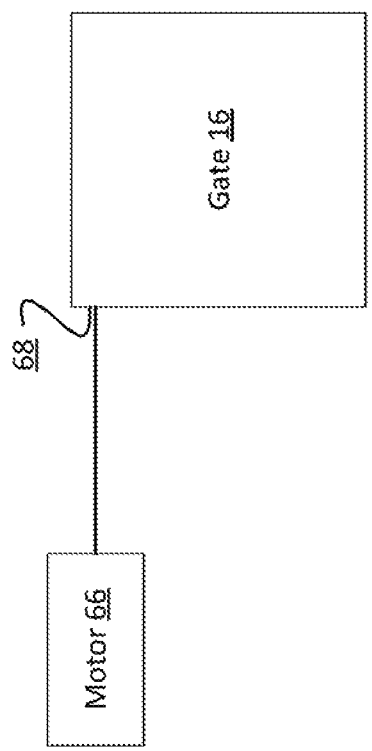
FIG. 17 is a view that depicts a motor controlling movement of an undershot gate in some embodiments.

FIG. 17 is a view that depicts a motor 66 controlling movement of an undershot gate 16 in some embodiments. In this embodiment, movement of gate 16 is controlled by a motor 66 driven or hydraulic arm coupled to the top 68 of gate 16. By pulling or pushing the top 68 of gate 16 the gate 16 will be raised or lowered to act as an undershot gate.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. An undershot gate system, to control flow of liquid through an open channel or pipe, including:
    a gate leaf;
    a flow diverter at an end of the gate leaf to guide liquid under the gate leaf and through an opening when the gate leaf is in an open position;
    a motor for raising and lowering the gate leaf to vary an opening height of the opening; and
    arrays of acoustic transducers for measuring a velocity field of the liquid passing through the opening,
    the flow diverter including an upstream curved surface to reduce a contraction of the velocity field so the opening height of the opening is approximately equal to a depth of the velocity field.

2. The undershot gate system of claim 1, wherein the flow diverter includes a substantially horizontally disposed projection from one side of the end of the gate leaf.

3. The undershot gate system of claim 2, wherein the substantially horizontally disposed projection is either upstream or downstream of the gate leaf.

4. The undershot gate system of claim 2, further including an additional pair of acoustic transducers on a bottom of the open channel or pipe adapted to provide an acoustic path to and from underneath the substantially horizontally disposed projection to allow measurement of the opening height of the gate leaf.

5. The undershot gate system of claim 1, wherein the arrays define measurement planes.

6. The undershot gate system of claim 5, wherein the measurement planes define horizontal measurement planes.

7. An undershot gate system to control flow of liquid through an open channel or pipe, the system including a gate leaf adapted to be raised and lowered by a motor to allow flow of liquid along the open channel or pipe, and a plurality of pairs of acoustic transducers forming an acoustic array on opposing walls of the open channel or pipe to provide, in use, a plurality of planes of crossed acoustic paths for measurement of flow velocity through an opening of the gate leaf and a means to measure a height of the opening of the gate leaf.

8. The undershot gate system of claim 7, wherein the means to measure the height of the opening of the gate leaf comprises a pair of acoustic transducers on a bottom of the open channel or pipe adapted to provide an acoustic path to and from underneath the gate leaf to allow measurement of the height of the opening of the gate leaf.

9. The undershot gate system of claim 8, wherein the plurality of pairs of acoustic transducers on opposing sides of the open channel or pipe are downstream and adjacent the gate leaf.

10. The undershot gate system of claim 8, wherein one set of respective acoustic transducers of the plurality of pairs of acoustic transducers on opposing sides of the open channel or pipe are downstream and adjacent the gate leaf and an other set of respective acoustic transducers of the plurality of pairs of acoustic transducers on opposing sides of the open channel or pipe are upstream and adjacent the gate leaf, with the plurality of multiple planes of crossed acoustic paths crossing through the opening of the gate leaf.

11. The undershot gate system of claim 7, wherein the plurality of pairs of acoustic transducers have a small beam angle to a direction of flow to allow each acoustic array to have a shorter width.

12. The undershot gate system of claim 7, further including a flow diverter at an end of the gate leaf to guide liquid under the gate leaf and through the opening of the gate leaf when the gate leaf is in an open position.

13. The undershot gate system of claim 12, wherein the flow diverter includes an arcuate section along one side of the end of the gate leaf.

14. The undershot gate system of claim 13, further including a substantially horizontally disposed projection from an other side of the end of the gate leaf.

15. The undershot gate system of claim 12, wherein the flow diverter includes a substantially horizontally disposed projection from one side of the end of the gate leaf.

16. The undershot gate system of claim 15, wherein the substantially horizontally disposed projection is either upstream or downstream of the gate leaf.

17. The undershot gate system of claim 16, wherein an arcuate section is provided along a free end of the substantially horizontally disposed projection.

18. A method of measuring flow rate of a liquid passing through an open gate of an undershot gate system installed in an open channel or pipe, the method including the steps of:
providing a plurality of pairs of acoustic transducers forming an acoustic array on opposing sides of the open channel or pipe, the acoustic arrays producing a plurality of planes of crossed acoustic paths;
providing means to measure a height of the open gate relative to a base of the open channel or pipe;
determining a vertical velocity profile of the liquid passing through the open gate utilising the acoustic arrays;
determining the height of the open gate utilising the means to measure the height of the open gate relative to the base of the open channel or pipe;
calculating a velocity integral of the vertical velocity profile utilising the determined height of the open gate; and
calculating the flow rate of the liquid passing through the open gate by multiplying the velocity integral by a predetermined internal width of the acoustic arrays.

19. The method of claim 18, wherein the plurality of pairs of acoustic transducers on opposing sides of the open channel or pipe are downstream and adjacent the gate.

20. The method of claim 18, wherein one set of respective acoustic transducers of the plurality of pairs of acoustic transducers on opposing sides of the open channel or pipe are downstream and adjacent the gate, and an other set of respective acoustic transducers of the plurality of pairs of acoustic transducers on opposing sides of the open channel or pipe are upstream and adjacent the gate, with the plurality of planes of crossed acoustic paths crossing through an opening of the gate.

21. An undershot gate system to control flow of liquid through an open channel or pipe, the system including a gate leaf adapted to be raised and lowered by a motor to allow flow of liquid along the open channel or pipe, the gate including a flow diverter at an end of the gate leaf to guide liquid under the gate leaf and through an opening when the gate leaf is in an open position;
wherein the flow diverter includes an arcuate section along one side of the end of the gate leaf; and
further including a substantially horizontally disposed projection from an other side of the end of the gate leaf.

22. An undershot gate system to control flow of liquid through an open channel or pipe, the system including a gate leaf adapted to be raised and lowered by a motor to allow flow of liquid along the open channel or pipe, the gate leaf including a flow diverter at an end of the gate leaf to guide liquid under the gate leaf and through an opening when the gate leaf is in an open position, the flow diverter including a substantially horizontally disposed projection from one side of the end of the gate leaf;
further including a pair of acoustic transducers on a bottom of the open channel or pipe adapted to provide an acoustic path to and from underneath the substantially horizontally disposed projection to allow measurement of the opening of the gate leaf.

* * * * *

UNITED STATES PATENT AND TRADEMARK OFFICE
CERTIFICATE OF CORRECTION

PATENT NO. : 9,759,591 B2
APPLICATION NO. : 14/435144
DATED : September 12, 2017
INVENTOR(S) : Damien Vernon Pearson et al.

It is certified that error appears in the above-identified patent and that said Letters Patent is hereby corrected as shown below:

On the Title Page

Item [86], Delete "PCT/US2013/001185" and insert --PCT/AU2013/001185--

Signed and Sealed this
Twelfth Day of March, 2019

Andrei Iancu
*Director of the United States Patent and Trademark Office*